(12) United States Patent
Han et al.

(10) Patent No.: US 7,491,119 B2
(45) Date of Patent: Feb. 17, 2009

(54) REAR AIR CONDITIONER FOR VEHICLE

(75) Inventors: Joong Man Han, Daejeon (KR); Joong Un Park, Daejeon (KR)

(73) Assignee: Halla Climate Control Corporation, Daejeon (KR)

( * ) Notice: Subject to any disclaimer, the term of this patent is extended or adjusted under 35 U.S.C. 154(b) by 0 days.

(21) Appl. No.: 11/072,225

(22) Filed: Mar. 7, 2005

(65) Prior Publication Data
US 2005/0202775 A1    Sep. 15, 2005

(30) Foreign Application Priority Data
Mar. 11, 2004    (KR) .................. 10-2004-0016410

(51) Int. Cl.
*B60H 3/00*    (2006.01)
(52) U.S. Cl. .................................... 454/156
(58) Field of Classification Search ................. 454/156
See application file for complete search history.

(56) References Cited

U.S. PATENT DOCUMENTS

| 4,531,671 | A | * | 7/1985 | Schwenk | ............ | 237/12.3 B |
| 5,305,829 | A | * | 4/1994 | Kumar | ............... | 166/245 |
| 5,988,263 | A | | 11/1999 | Schwarz et al. | | |
| 6,007,421 | A | | 12/1999 | Schwarz et al. | | |
| 6,048,263 | A | * | 4/2000 | Uchida et al. | ............ | 454/121 |
| 2001/0025707 | A1 | * | 10/2001 | Onda et al. | ............ | 165/202 |

FOREIGN PATENT DOCUMENTS

| EP | 1 273 465 | 1/2003 |
| JP | 11-348533 | 12/1999 |
| JP | 2000-283576 | 10/2000 |

OTHER PUBLICATIONS

Patent Abstracts of Japan, No. 2000 283576, Oct. 13, 2000.

* cited by examiner

*Primary Examiner*—Steve McAllister
*Assistant Examiner*—Helena Kosanovic
(74) *Attorney, Agent, or Firm*—Lowe, Hauptman, Ham & Berner, LLP (57) ABSTRACT

A rear air conditioner is installed at a rear side of a vehicle and supplies conditioned air to a rear seat area of a passenger compartment of the vehicle. The rear air conditioner includes a case, a heat exchanger for cooling, a heat exchanger for heating, and a bypass passage for guiding part of warm air. The case includes an inlet port through which air blown from a blower enters, a vent outlet port, and a floor outlet port. The heat exchanger for cooling and the heat exchanger for heating are installed in an airflow path formed inside the case. The bypass passage extends from an outlet of the heat exchanger for heating to the floor outlet port so that warm air passing through the heat exchanger for heating can be directly discharged to the floor outlet port. Accordingly, the rear air conditioner can offer improved performance to control a vertical difference of temperature in a cold and warm air mixing mode.

8 Claims, 8 Drawing Sheets

FIG. 1

PRIOR ART

FIG. 2

PRIOR ART

REAR AIR CONDITIONER FOR VEHICLE

This application claims the priority of Korean Patent Application No. 10-2004-0016410, filed on Mar. 11, 2004, in the Korean Intellectual Property Office, the disclosure of which is incorporated herein in its entirety by reference.

BACKGROUND OF THE INVENTION

1. Field of the Invention

The present invention relates to an air conditioner for a vehicle, and more particularly, to a rear air conditioner, which is installed at a rear side of a vehicle and supplies conditioned air to a rear seat area of a passenger compartment of the vehicle.

2. Description of the Related Art

In general, heaters induce high temperature cooling water from an engine to a heater core, heat air flowing around the heater core using the cooling water induced to the heater core to produce warm air, and supply the produced warm air to a passenger compartment of a vehicle.

Japanese Patent Laid-Open Publication No. 2000-283576 discloses an air conditioning system having a rear air conditioner for cooling and heating a rear seat area of a passenger compartment of a vehicle.

Rear air conditioners are installed at a rear side of a vehicle and cool and heat a rear seat area of a passenger compartment of the vehicle. The rear air conditioners may be manufactured as a type only for generating cold air and a type only for generating warm air according to requirements of vehicle makers. In recent years, the rear air conditioners are manufactured as an air mixing type in which cold air and warm air are mixed to provide a more comfortable atmosphere to users.

In the air mixing type rear air conditioners, a heater core and an evaporator core are properly arranged such that warm air and cold air respectively provided by the heater core and the evaporator core can be mixed to produce mixed air at an optimum temperature and the mixed air can be supplied to a desired outlet port through a vent duct or a floor duct according to a user's operation.

In the meantime, when it comes to a layout of the rear air conditioners, the rear air conditioners are under many restrictions due to the shape of the vehicle, that is, due to vehicle parts (e.g., a wheel base and a rear lamp) installed in the rear seat area. Since it is difficult to properly arrange the heater core and the evaporator core in the limited area, the temperature control performance of the rear air conditioners to eliminate horizontal and vertical differences of room temperature may be degraded.

Figure 1:
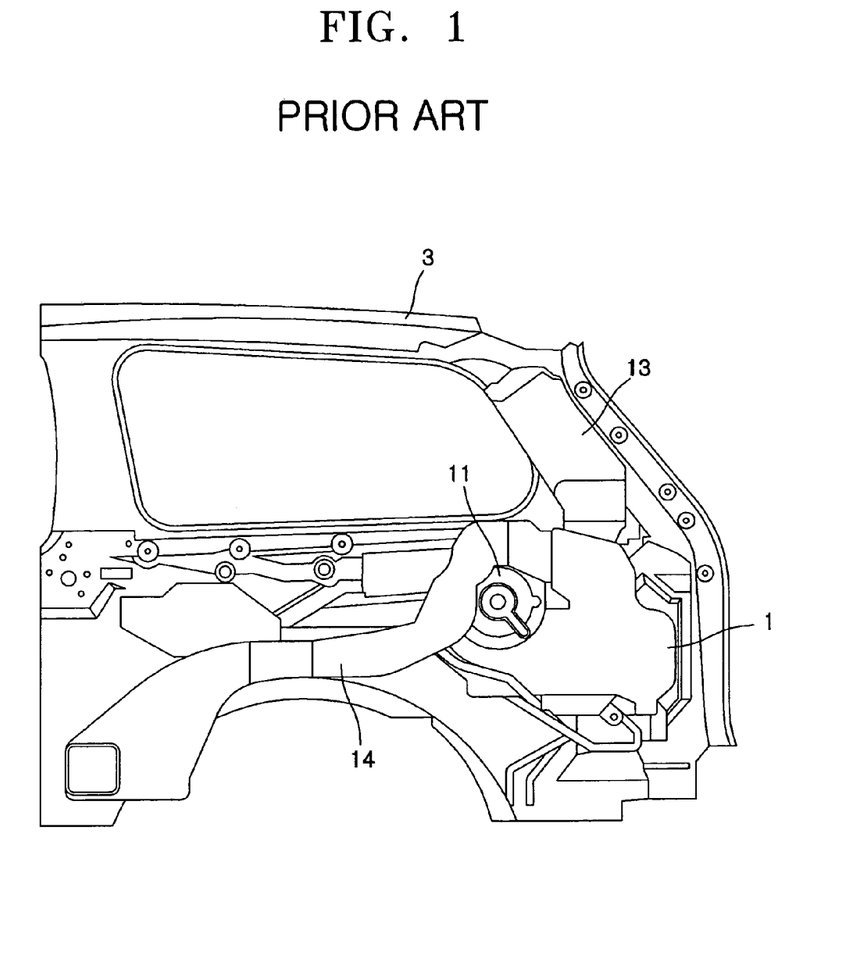
FIG. 1 is a schematic, partial sectional view of a rear seat of a vehicle provided with a conventional rear air conditioner.

FIG. 1 is a schematic partial sectional view of a rear seat of a vehicle provided with a conventional rear air conditioner 1. FIG. 1 illustrates just a rear side of the vehicle. The conventional rear air conditioner 1 is mounted on a side of a vehicle body 3. The conventional rear air conditioner 1 thermally exchanges blown from a blower 11 to control temperature. The air controlled by the rear air conditioner 1 is discharged toward a passenger's head through a rear vent outlet port 13 or toward the passenger's feet through a rear floor outlet port 14.

Figure 2:
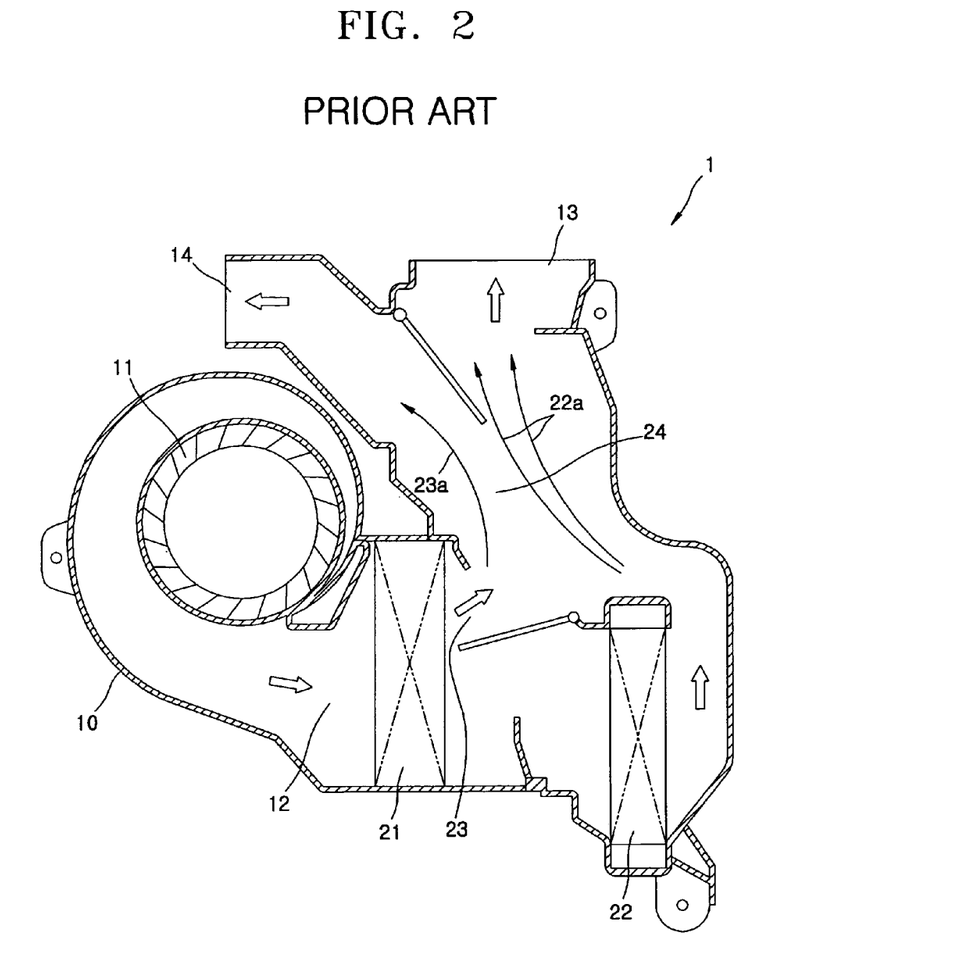
FIG. 2 is a schematic sectional view of the conventional rear air conditioner shown in FIG. 1.

FIG. 2 is a schematic sectional view of the rear air conditioner shown in FIG. 1.

Referring to FIG. 2, the rear air conditioner 1 for the vehicle includes a case 10, a heat exchanger 21 for cooling, a heat exchanger 22 for heating, an air passage 23, and a mixing room 24.

The case 10 includes an inlet port 12 through which air enters from the blower 11, the vent outlet port 13, and the floor outlet port 14. The heat exchanger 21 cools the inlet air and produces cold air 23a. The heat exchanger 22 heats the cold air 23a and produces warm air 22a. The air passage 23 is a path through which air passing through the heat exchanger 21 for cooling enters the mixing room 24. The mixing room 24 permits the cold air 23a and the warm air 22a to be mixed therein.

The rear air conditioner 1 can discharge mixed air through the vent outlet port 13 and the floor outlet port 14. The mixed air is produced after the cold air 23a and the warm air 22a are mixed in the mixing room 24.

However, as shown in FIG. 2, the cold air 23a and the warm air 22a are not sufficiently mixed in the mixing room 24, such that most of the cold air 23a is discharged through the floor outlet port 14, and most of the warm air 22a is supplied through the vent outlet port 13.

In the meanwhile, when the rear air conditioner 1 supplies the mixed air, the rear air conditioner 1 generally should provide relatively warm air to the passenger's feet and relatively cold air to the passenger's head by making the temperature of the mixed air discharged through the floor outlet port 14 higher than the temperature of the mixed air discharged through the vent outlet port 13, so as to provide a comfortable atmosphere to the passenger.

However, in reality, the rear air conditioner 1 supplies relatively cold air to the floor outlet port 14, which is directed toward the passenger's feet, and relatively warm air to the vent outlet port 13, which is directed toward the passenger's head, due to the arrangement of the heat exchangers in the limited area that the floor outlet port is disposed near to the heat exchanger for cooling, thereby failing to provide a comfortable atmosphere to the passenger.

Accordingly, the conventional rear air conditioner 1 does not demonstrate satisfactory performance to control a vertical difference of temperature, which means a temperature difference between the floor outlet port and the vent outlet port, to users when it supplies the mixed air.

On the other side, Japanese Patent Laid-Open Publication No. 1999-348533 discloses a front air conditioner, in which air passages for bypassing air flowing under a heat exchanger for heating toward a defrost vent are installed on both sides of a case to increase the temperature of air emitted from a defrost orifice and ensure smooth defrosting.

SUMMARY OF THE INVENTION

The present invention provides a rear air conditioner, which can provide improved performance to control a vertical difference of temperature in a cold and warm air mixing mode.

According to an aspect of the present invention, there is provided a rear air conditioner installed at a rear side of a vehicle and supplying conditioned air to a rear seat area of a passenger compartment of the vehicle, the rear air conditioner comprising: a case, a heat exchanger for cooling, a heat exchanger for heating, and a bypass passage.

The case includes an inlet port through which air blown from a blower enters a vent outlet port, and a floor outlet port. The heat exchanger for cooling and the heat exchanger for heating are installed in an airflow path formed inside the case.

The bypass passage may be formed by attaching a cover, which includes a body extending from the outlet of the heat exchanger for heating to the floor outlet port and a flange formed at the body and contacting the inside of the case.

The bypass passage is formed inside the case to extend from an outlet of the heat exchanger for heating to the floor outlet port so that part of air passing through the heat exchanger for heating can be directly discharged to the floor outlet port.

The bypass passage may be formed by a duct extending from the outlet of the heat exchanger for heating to the floor outlet port. A sectional area of an inlet of the bypass passage may range from 15 to 50% of a sectional area of the outlet of the heat exchanger for heating.

An outlet of the bypass passage may be disposed outside a rotating range of a mode door so as not to interfere with the mode door that is opened or closed to control air flow to the vent outlet port and the floor outlet port. An outlet of the bypass passage may be disposed so that air discharged from the bypass passage can be guided by the mode door to be supplied to the floor outlet port.

Accordingly, the rear air conditioner of the present invention can offer improved performance to control a vertical difference of temperature in the cold and warm air mixing mode (i.e., bi-level mode).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 3:
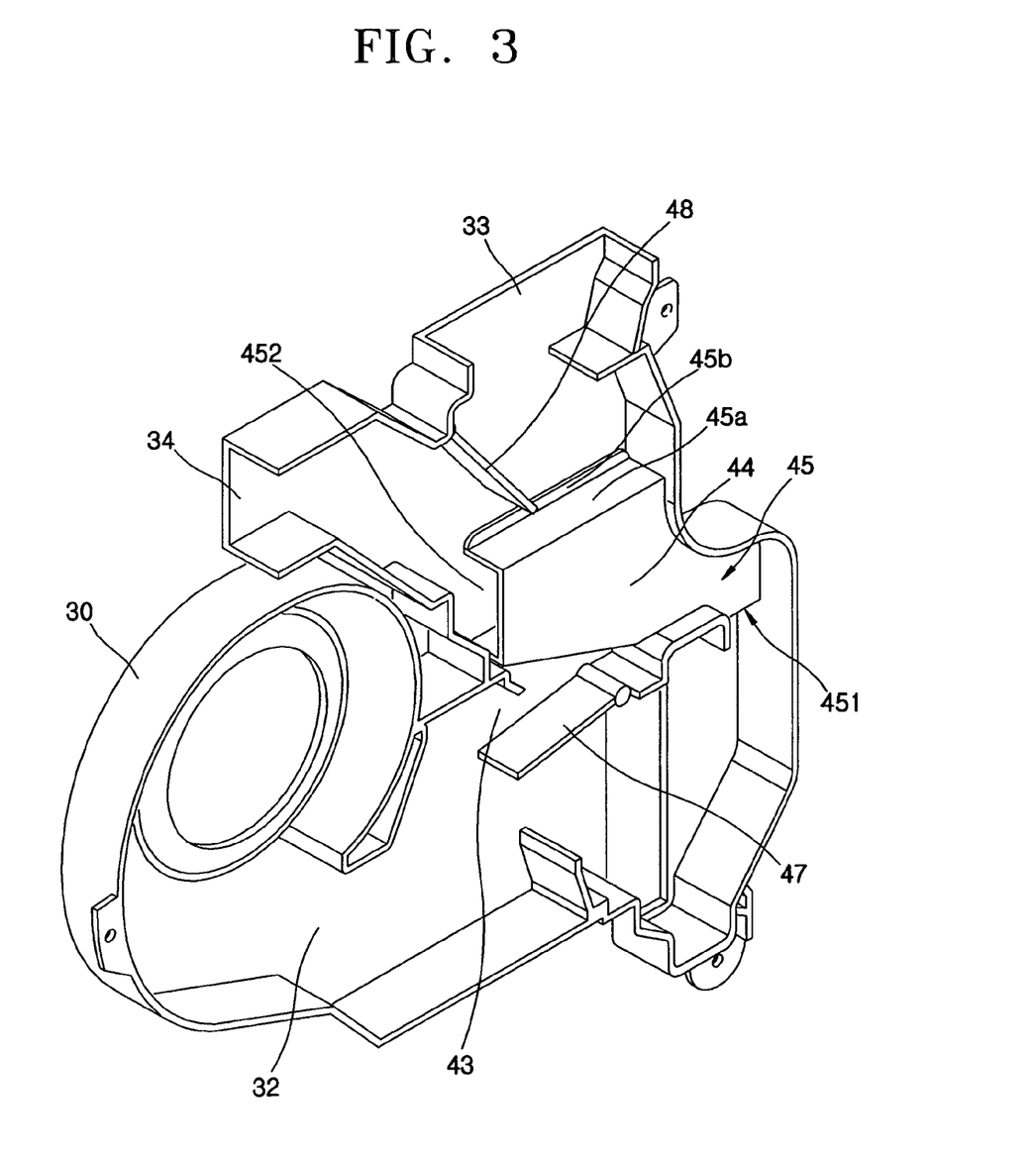
FIG. 3 is a schematic, partial exploded perspective view of a rear air conditioner, in a case of which a bypass passage is installed, according to an embodiment of the present invention.
Figure 4:
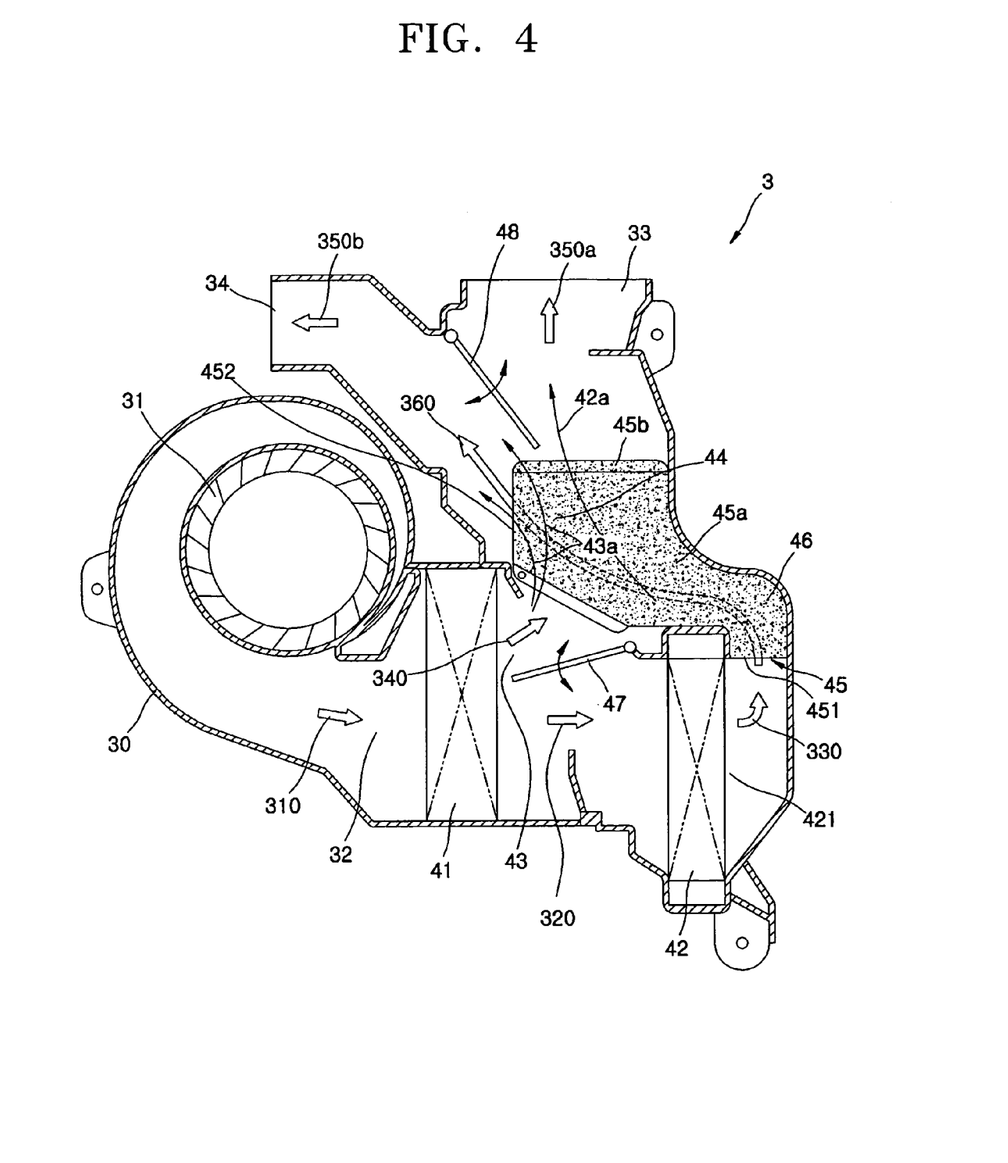
FIG. 4 is a schematic sectional view of the rear air conditioner shown in FIG. 3.

FIG. 3 is a schematic, partial exploded perspective view of a rear air conditioner, in a case of which a bypass passage is installed, according to an embodiment of the present invention. FIG. 4 is a schematic sectional view of the rear air conditioner shown in FIG. 3. A heat exchanger for cooling and a heat exchanger for heating shown in FIG. 4 are not shown in FIG. 3.

Referring to FIGS. 3 and 4, a rear air conditioner 3 for a vehicle includes a case 30, a heat exchanger 41 for cooling, a heat exchanger 42 for heating, an air passage 43, a mixing room 44, and a bypass passage 45 for guiding part of warm air. Here, the rear air conditioner 3 may be installed at a rear side of the vehicle and supply conditioned air to a rear seat area of a passenger compartment of the vehicle.

The case 30 includes an inlet port 32 through which air blown from a blower 31 enters a vent outlet port 33, and a floor outlet port 34. The heat exchanger 41 for cooling and the heat exchanger 42 for heating are installed in an airflow path inside the case 30. The bypass passage 45 in which air can flow extends from an outlet 421 of the heat exchanger 42 for heating to the floor outlet port 34 so that warm air 330 produced after passing through the heat exchanger 42 for heating can be directly discharged to the floor outlet port 34.

The bypass passage is formed by attaching a cover 45 to the inside of the case 30. The cover 45 includes a body 45a extending from the outlet 421 of the heat exchanger 42 for heating to the floor outlet port 34 and a flange 45b installed at one side of the body 45a and contacting the inside of the case 30.

The case 30 includes the inlet port 32, the vent outlet port 33, and the floor outlet port 34. The inlet port 32 allows air 310 blown from the blower 31 to be introduced therethrough. The vent outlet port 33 supplies conditioned air 350a to a vent of the vehicle, that is, to a roof of the vehicle. The floor outlet port 34 supplies conditioned air 350b to a floor of the vehicle.

The heat exchanger 41 for cooling cools the inlet air 310 and produces cold air 320 and 340. The heat exchanger 41 for cooling is mounted on the side of the inlet port 32 in the case 30. Here, the heat exchanger 41 for cooling, for example, an evaporator core, may be installed on the side of the inlet port 32 in the case 30 so that all the entering air 310 can pass through the heat exchanger 41 for cooling. Here, the heat exchanger 41 for cooling may be operated or non-operated by turning on or off a compressor. Air blown from the heat exchanger 41 for cooling may be cooled or not depending on whether the heat exchanger 41 for cooling is operated.

The cold air 320 cooled after passing through the heat exchanger 41 for cooling flows to the heat exchanger 42 for heating through a path directed toward the heat exchanger 42 for heating. Further, part of the cold air passing through the heat exchanger 41 for cooling becomes the cold air 340 that flows to the mixing room 44 through the air passage 43 without passing through the heat exchanger 42 for heating. That is, the cold air 340 passing through the heat exchanger 41 for cooling is directly delivered to the mixing room 44 without passing through the heat exchanger 42 for heating, as shown by arrow 43a.

The heat exchanger 42 for heating heats the cold air 320 and produces the warm air 330. The heat exchanger 42 for heating is mounted at one side in the case 30 to be spaced a predetermined distance from the heat exchanger 41 for cooling. Here, the heat exchanger 42 for heating may be a heater core that heats air passing therethrough. The warm air 330 produced by the heat exchanger 42 for heating flows from the outlet 421 of the heat exchanger 42 for heating to the mixing room 44 along a warm air passage 46 connected to the mixing room 44. Further, part 360 of the warm air 330 heated by the heat exchanger 42 for heating does not pass through the warm air passage 46 but is directly delivered to the floor outlet port 34 by the cover 45 that partitions the warm air passage 46 inside the case 30. As shown in FIGS. 3 and 4, the cover 45 includes the body 45a and the flange 45b formed at an end of the body 45a. The cover 45 disposed inside the case 30 is attached to one side surface of the case 30 so that air can flow to the warm air passage 46 and the mixing room 44. Of course, the cover 45 may be disposed on both side surfaces of the case 30.

The rear air conditioner 3 includes a temperature control door 47 for controlling the direction of the cold air 320 and the amount of the cold air 320 flowing to the heat exchanger 42 for heating so that the cold air 340 can avoid passing through the heat exchanger 42 for heating and can be supplied to the inside of the vehicle through at least one of the vent outlet port 33 and the floor outlet port 34. That is, in a cooling mode, an inlet port of the heat exchanger 42 for heating is completely closed such that air passing through the heat exchanger 41 for cooling can be directly introduced to the mixing room 44, and in a heating mode, the inlet port of the heat exchanger 42 for heating is opened such that air can be heated and supplied to the mixing room 44. In a bi-level mode, which is a cold and warm air mixing mode, the inlet port of the heat exchanger 42 for heating is partially opened such that part of air can be heated and then supplied to the mixing room 44, and the other part of the air can be directly introduced into the mixing room 44 after passing through the heat exchanger 41 for cooling.

The temperature control door 47 controls the amount of the cold air 340 and the warm air 330 supplied to the mixing room 44, thereby controlling the temperature of the mixed air 350a and 350b discharged to the vent outlet port 33 and the floor outlet port 34.

The mixing room 44 is a space in which the cold air 340 and the warm air 330 are mixed. As shown in FIG. 4, the mixing room 44 is formed between the heat exchangers 41 and 42 for cooling and heating and the vent and floor outlet ports 33 and 34.

According to the present embodiment, the rear air conditioner 3 further includes a mode door 48 for controlling the direction of the mixed air 350a and 350b and the amount of the mixed air 350a and 350b respectively discharged through the vent outlet port 33 and the floor outlet port 34 so that a ratio of the mixed air 350a and 350 respectively supplied through the vent outlet port 33 and the floor outlet port 34 to the inside of the vehicle can be controlled.

Here, as shown in FIGS. 3 and 4, it is preferable that the mode door 48 be disposed between the mixing room 44, the vent outlet port 33, and the floor outlet port 34, such that the vent outlet port 33 and the floor outlet port 34 can be opened and closed using one door.

The cover 45 extends from the outlet 421 of the heat exchanger 42 for heating to the floor outlet port 34 so that the air heated after passing through the heat exchanger 42 for heating can be discharged to the floor outlet port 34 without passing through the mixing room 44. That is, an inlet 451 of the cover 45 (i.e., the bypass passage) is formed on the side of the outlet 421 of the heat exchanger 42 for heating and an outlet 452 of the cover 45 is formed on the side of the floor outlet port 34.

Here, if other elements are placed within a rotating range of the mode door 48, the mode door 48 cannot smoothly pivot. Accordingly, the outlet 452 of the cover 45 is formed so as not to interfere with the mode door 48.

Here, it is preferable that the cover 45 be formed inside the case 30 in a path extending from the heating exchanger 41 for cooling to the vent outlet port 33 to be separated from the mixing room 44. To this end, the case 30 may have a double structure by manufacturing the case 30 using a mold with a double structure from the beginning, or attaching a separate structure for forming the bypass passage to the case 30 so that holes for the inlet 451 and the outlet 452 of the cover 45 can be connected to each other. Furthermore, the bypass passage may be additionally mounted inside the case 30 as the cover 45, or may be integrally formed with the case 30.

Also, it is preferable that a sectional area of the cover 45 range from 15 to 50% of a sectional area of the outlet 421 of the heat exchanger 42 for heating. If the sectional area of the cover 45 is less than 15%, satisfactory performance to control a vertical difference of temperature cannot be achieved, and if the sectional area of the cover 45 is greater than 50%, warm air is excessively introduced to the floor and the entire temperature control performance is degraded. Accordingly, only 15 to 50% of the warm air passing through the heat exchanger 42 for heating is directly sent to the floor outlet port 34, and the remaining air passes through the mixing room 44 to be mixed with the cold air 340 and is supplied to the vent outlet ports 33 and the floor outlet port 34. Accordingly, the mixed air 350a and 350b respectively supplied through the vent outlet port 33 and the floor outlet port 34 to the inside of the vehicle can have optimum temperatures, thereby making it possible for the passenger to feel comfortable. In particular, as compared with a rear air conditioner 1 shown in FIG. 2, the rear air conditioner 3 can supply a sufficient amount of warm air to the floor outlet port 34. To this end, the cover outlet 452 may be located toward the floor outlet port 34.

Figure 5:
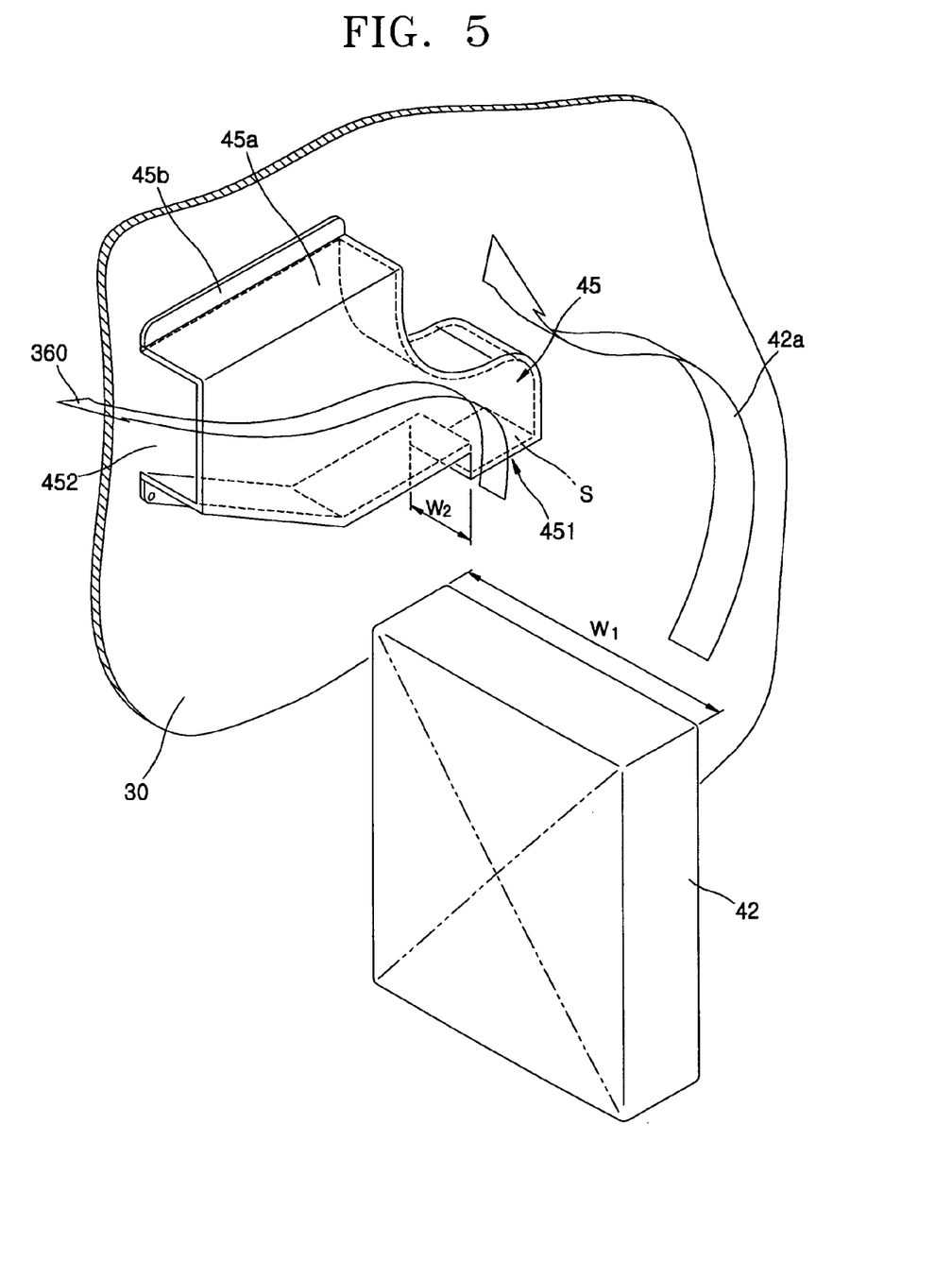
FIG. 5 is a schematic perspective view illustrating air flowing between a heat exchanger for heating and the bypass passage in the rear air conditioner shown in FIG. 4.

FIG. 5 is a schematic perspective view illustrating air flowing between the heat exchanger 42 for heating and the cover 45 in the rear air conditioner shown in FIG. 4. Referring to FIG. 5, a width $W_2$ of the inlet 451 of the cover 45 is less than a width $W_1$ of the outlet 421 of the heat exchanger 42 for heating, such that part 42a of warm air passing through the heat exchanger 42 for heating is directly delivered to the mixing room 44 (see FIG. 4) without passing through the inlet 451 of the cover 45. Remaining warm air 360 of the warm air passing through the heat exchanger 42 for heating is introduced through the inlet 451 of the cover 45, which is the bypass passage with a predetermined sectional area S, and then flows to the cover outlet 452 and directly to the floor outlet port 34. Here, it is preferable that the width $W_2$ of the cover inlet 451 correspond to 15 to 50% of the width $W_1$ of the outlet 421 of the heat exchanger 42 for heating. That is, only 15 to 50% of the warm air passing through the heat exchanger 42 for heating is directly delivered to the floor outlet port 34 by means of the cover 45 and the remaining air passes through the mixing room 44 to be mixed with the cold air 340 and then is supplied to the vent outlet port 33 and the floor outlet port 34.

Further, the mixed air 350b supplied through the floor outlet port 34 has a higher temperature than the mixed air 350a supplied through the vent outlet port 33, thereby providing a comfortable atmosphere to the passenger.

Figure 6A:
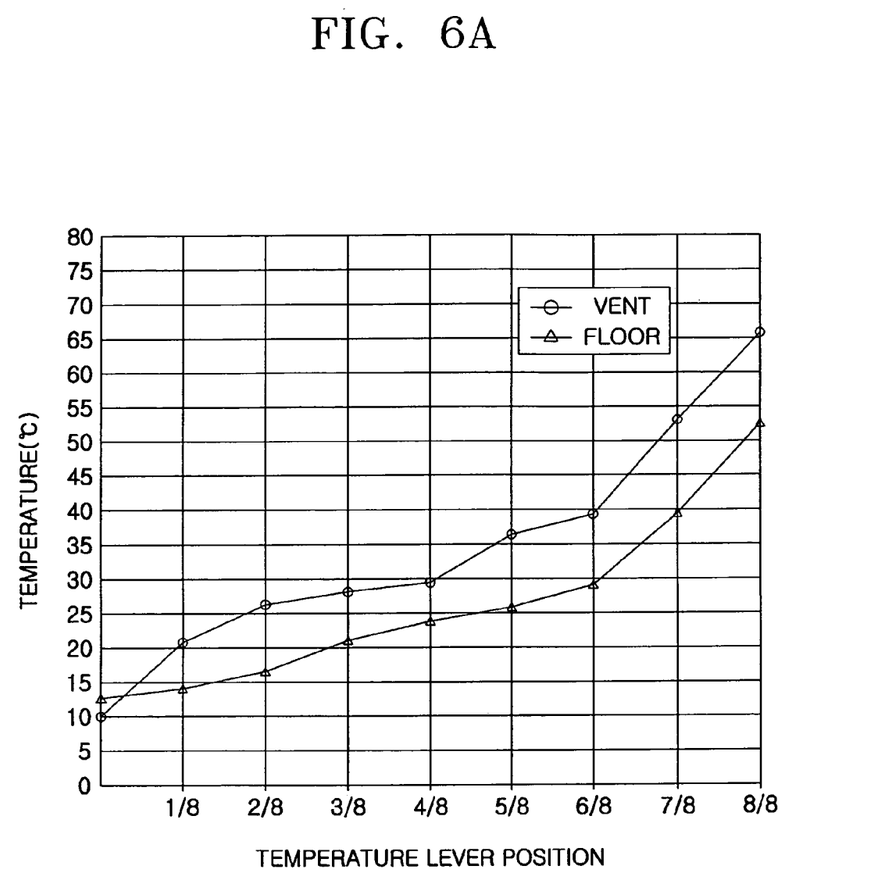
FIGS. 6A and 6B are graphs illustrating temperature control performances between a rear air conditioner without a bypass passage and a rear air conditioner with a bypass passage according to the present invention.
Figure 6B:
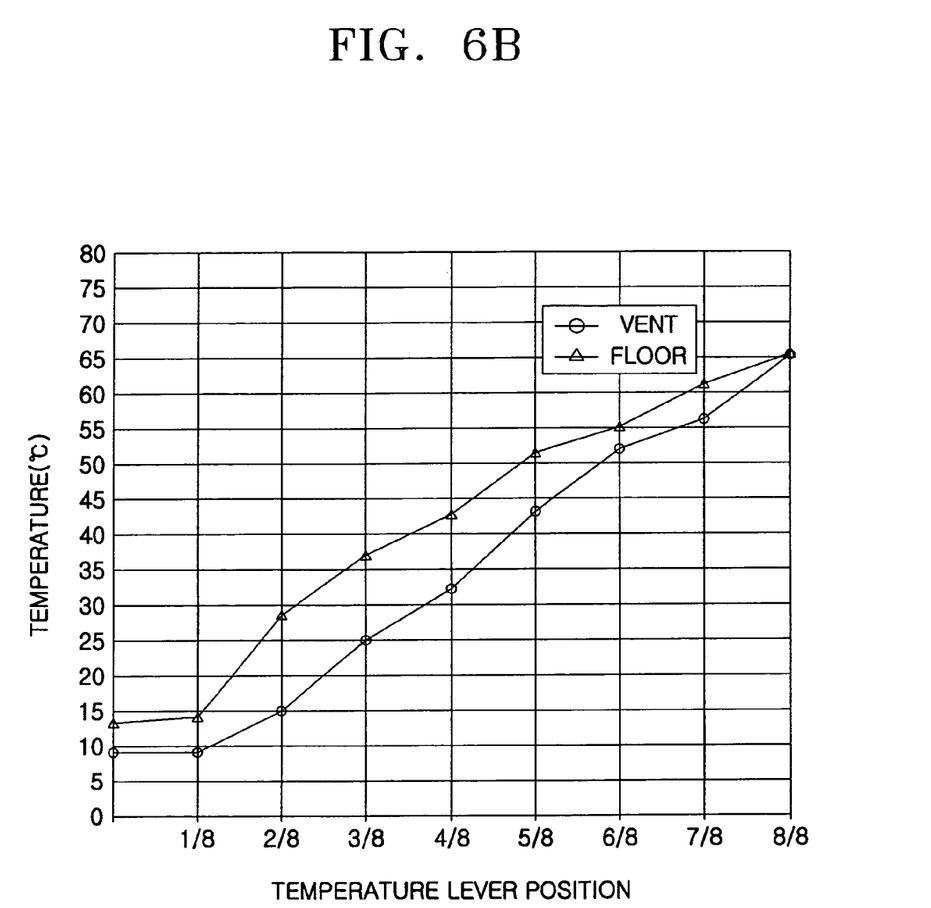

FIGS. 6A and 6B are graphs illustrating comparison results of temperature control performance between a rear air conditioner without a bypass passage and a rear air conditioner with a bypass passage according to the present invention.

FIG. 6A illustrates a temperature distribution of air flowing through the vent outlet port and the floor outlet port in positions (from 0 to 8/8) of a temperature lever for controlling the temperature control door. In the temperature lever position of 0, the air flow toward the heat exchanger for heating is completely closed by the temperature control door, and in the temperature lever position of 8/8, the air flow toward the heat exchanger for heating is completely opened by the temperature control door. Referring to FIG. 6A, in the closed position 0, the temperature of air flowing to the floor outlet port is higher than the temperature of air flowing to the vent outlet port, whereas in the other opened positions, the temperature of air flowing to the vent outlet port is higher than the temperature of air flowing to the floor outlet port. Therefore, while the temperature control door is opened by the lever, temperature of the air to the vent is higher than the temperature of the air to the floor, since the floor outlet port is disposed near to the heat exchanger for cooling. Accordingly, the passenger of the vehicle cannot feel comfort.

However, in the rear air conditioner provided with the bypass passage according to the present invention, as shown in FIG. 6B, except that the temperature of air flowing to the vent outlet port is almost similar to the temperature of air flowing to the floor outlet port in the position of 8/8, the temperature of the air to the floor outlet port is relatively higher than the temperature of the air to the vent outlet port in all the positions including the closed position and the opened positions of the temperature lever that controls the temperature control door. Accordingly, the passenger of the vehicle can feel more comfortable.

Figure 7:
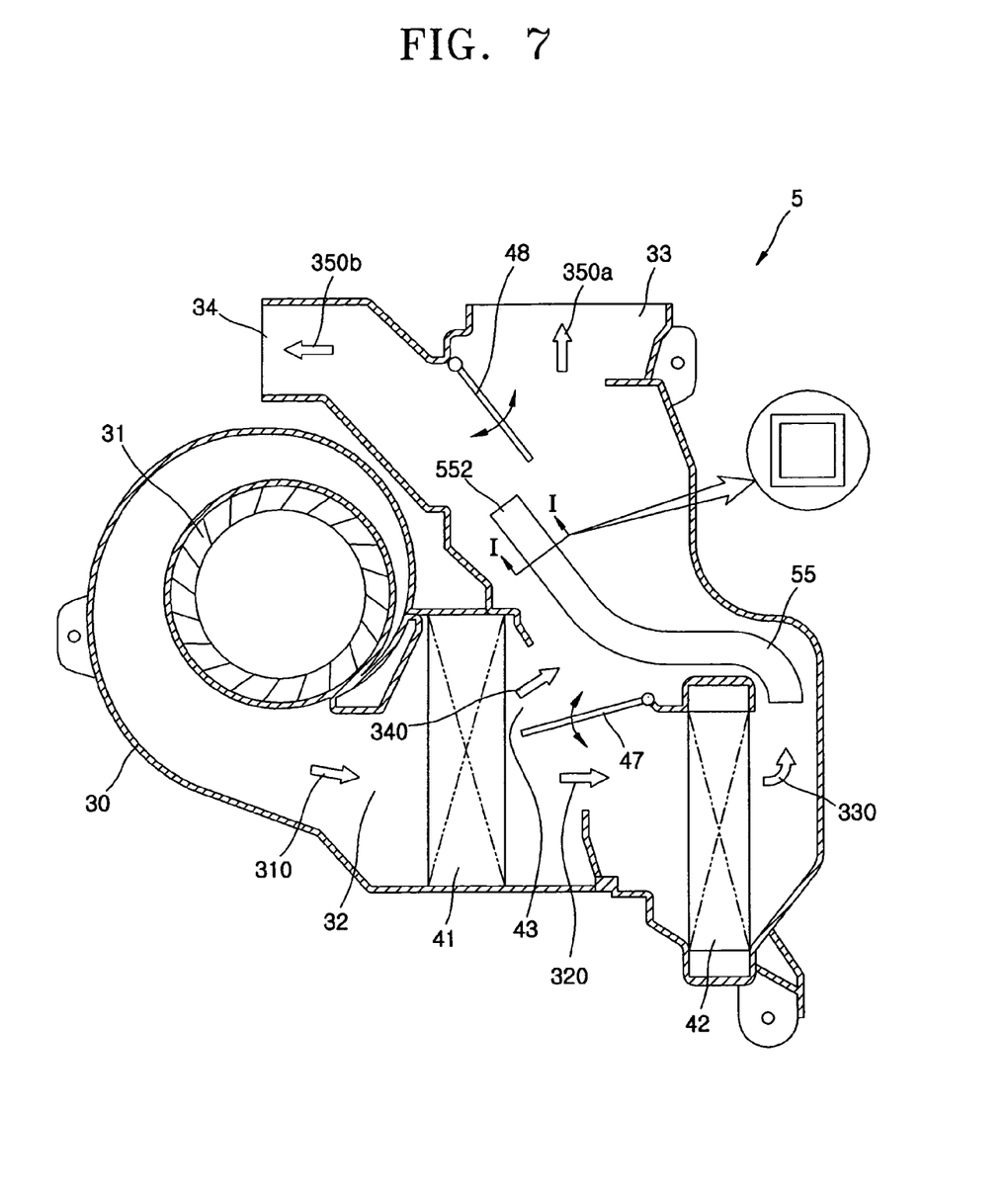
FIG. 7 is a schematic sectional view of a rear air conditioner for a vehicle according to another embodiment of the present invention.

FIG. 7 is a rear air conditioner 5 for a vehicle according to another embodiment of the present invention. As shown in FIG. 7, the bypass passage may be formed by a duct 55 extending from the outlet 421 of the heat exchanger 42 for heating to the floor outlet port 34. The duct is formed inside of the case. Since other elements of the rear air conditioner 5 shown in FIG. 5 are the same as those of the rear air conditioner 3 illustrated in FIGS. 3 and 4, a detailed explanation thereof will not be given (see FIGS. 3 and 4 for the detailed explanation; if necessary).

When taken along line I-I of FIG. 7, the duct 55 has a square hollow section. An inlet 551 of the duct 55 is formed on the side of the outlet 421 of the heat exchanger 42 for heating and an outlet 552 of the duct 55 is formed on the side of the floor outlet port 34, such that the duct 55 extends from the outlet 421 of the heat exchanger 42 for heating to the floor outlet port 34.

Although the present invention relates to the air conditioner and the present embodiment specifically illustrates the rear air conditioner installed at the rear side of the vehicle and supplying conditioned air to the rear seat area of the passenger compartment of the vehicle, the rear air conditioner according to the present invention including the bypass passage extending from the outlet of the heat exchanger for heating to the floor outlet port can be applied to various types of air conditioners for improved performance to control a difference of temperature through easy design modification.

As described above, the rear air conditioner according to the present invention can improve performance to control a vertical difference of temperature in the cold and warm air mixing mode (i.e., bi-level mode) by forming the bypass passage thereinside without changing an existing layout and directly inducing part of warm air to the floor outlet port.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rear air conditioner installed at a rear side of a vehicle and supplying conditioned air to a rear seat area of a passenger compartment of the vehicle, the rear air conditioner comprising:

a case including an inlet port through which air blown from a blower enters a vent outlet port, and a floor outlet port;

a heat exchanger for cooling and a heat exchanger for heating installed in an airflow path formed inside the case;

a mixing room which is formed between the two heat exchangers and the two outlet ports and in which cooled air at an outlet of the heat exchanger for cooling and heated air at an outlet of the heat exchanger for heating are mixed together to form mixed air that is to be delivered to the two outlet ports; and a single bypass passage formed inside the case to extend though said mixing room from the outlet of the heat exchanger for heating to the floor outlet port so that a part of the heated air can bypass the mixing room and be directly discharged to the floor outlet port through said bypass passage so as to re-mix said part of the heated air with the mixed air passing through the mixing room and to increase the temperature of air at the floor outlet port to be higher than the temperature of air at the vent outlet port;

wherein said bypass passage is suffounded at least partially by the mixed air that is being mixed in the mixing room.

2. The rear air conditioner of claim 1, wherein the bypass passage is formed by attaching a cover, which includes a body extending from the outlet of the heat exchanger for heating to the floor outlet port and a flange formed at the body and contacting the inside of the case.

3. The rear air conditioner of claim 1, wherein the bypass passage is formed by a duct extending from the outlet of the heat exchanger for heating to the floor outlet port.

4. The rear air conditioner of claim 1, wherein a sectional area of an inlet of the bypass passage ranges from 15 to 50% of a sectional area of the outlet of the heat exchanger for heating.

5. The rear air conditioner of claim 1, wherein an outlet of the bypass passage is disposed outside a rotating range of a mode door so as not to interfere with the mode door that is opened or closed to control air flow to the vent outlet port and the floor outlet port.

6. The rear air conditioner of claim 1, wherein an outlet of the bypass passage is disposed so that air discharged from the bypass passage can be guided by a mode door to be supplied to the floor outlet port.

7. The rear air conditioner of claim 1, wherein a cross section of an outlet of the bypass passage is larger than a cross section of an inlet of the bypass passage.

8. The rear air conditioner of claim 2, wherein the bypass passage has an inlet and an outlet which are located without facing each other.

* * * * *